United States Patent
Li et al.

(10) Patent No.: US 9,615,084 B2
(45) Date of Patent: Apr. 4, 2017

(54) METHOD AND SYSTEM FOR REDUCING STEREOSCOPIC DISPLAY CROSSTALK

(71) Applicant: SuperD Co. Ltd., Shenzhen (CN)

(72) Inventors: Dongfang Li, Shenzhen (CN); Zhang Ge, Shenzhen (CN); Lei Song, Shenzhen (CN); Ning Liu, Shenzhen (CN)

(73) Assignee: SUPERD CO. LTD., Shenzhen (CN)

( * ) Notice: Subject to any disclaimer, the term of this patent is extended or adjusted under 35 U.S.C. 154(b) by 652 days.

(21) Appl. No.: 13/904,129

(22) Filed: May 29, 2013

(65) Prior Publication Data

US 2013/0321596 A1    Dec. 5, 2013

(30) Foreign Application Priority Data

May 31, 2012   (CN) .......................... 2012 1 0176601

(51) Int. Cl.
   *H04N 13/04*    (2006.01)
   *H04N 13/00*    (2006.01)

(52) U.S. Cl.
   CPC ..... *H04N 13/0497* (2013.01); *H04N 13/0018* (2013.01); *H04N 13/0409* (2013.01)

(58) Field of Classification Search
   None
   See application file for complete search history.

(56) References Cited

U.S. PATENT DOCUMENTS

| 2009/0153652 A1* | 6/2009 | Barenbrug ......... H04N 13/0018 348/54 |
| 2009/0167639 A1* | 7/2009 | Casner ............... G02B 27/2214 345/58 |
| 2012/0092520 A1* | 4/2012 | Proca ...................... H04N 9/69 348/223.1 |

FOREIGN PATENT DOCUMENTS

| CN | 101123736 A | 2/2008 |
| CN | 102244797 A | 11/2011 |
| CN | 102316351 A | 1/2012 |
| CN | 102550032 A | 7/2012 |

\* cited by examiner

*Primary Examiner* — Chikaodili E Anyikire
(74) *Attorney, Agent, or Firm* — Anova Law Group, PLLC

(57) ABSTRACT

A three-dimensional (3D) display system is provided for displaying a 3D image including a first view image and a second view image to a viewer. The 3D display system includes an arrangement module, a processing module, and a displaying module. The arrangement module is configured to alternatingly arrange display units of the first view image and display units of the second view image on a display panel. The processing module is configured to obtain an information difference of a display unit of the second view image from the display units of the first view image, and re-calculate a pixel value of the display unit of the second view image. The displaying module is configured to display to the viewer the display unit of the second view image with the re-calculated pixel value via a light separation device.

18 Claims, 4 Drawing Sheets

METHOD AND SYSTEM FOR REDUCING STEREOSCOPIC DISPLAY CROSSTALK

CROSS-REFERENCES TO RELATED APPLICATIONS

This application claims the priority of Chinese patent application number no. 201210176601.9, filed on May 31, 2012, the entire contents of which are incorporated herein by reference.

FIELD OF THE INVENTION

The present disclosure generally relates to the opt-electronic technologies and, more particularly, to devices and methods for reducing stereoscopic display crosstalk.

BACKGROUND

With the rapid development of the stereoscopic display technologies, especially due to the recent strong box-office appeal of the three dimensional (3D) movies, more and more research organizations and manufacturers start focusing on the research and development of stereoscopic display technology and equipment. Currently, autostereoscopic display techniques have been used in the fields of smart phones, tablets, notebook computers, and TVs, etc. and a series of related products have been on the market. However, current products often have 3D crosstalk, which may seriously affect 3D displaying quality.

The disclosed device and method are directed to solve one or more problems set forth above and other problems.

BRIEF SUMMARY OF THE DISCLOSURE

One aspect of the present disclosure includes a three-dimensional (3D) display system for displaying a 3D image including a first view image and a second view image to a viewer. The 3D display system includes an arrangement module, a processing module, and a displaying module. The arrangement module is configured to alternatingly arrange display units of the first view image and display units of the second view image on a display panel. The processing module is configured to obtain an information difference of a display unit of the second view image from the display units of the first view image, and re-calculate a pixel value of the display unit of the second view image. The displaying module is configured to display to the viewer the display unit of the second view image with the re-calculated pixel value via a light separation device.

Another aspect of the present disclosure includes a method for reducing stereoscopic display crosstalk in a 3D display system for displaying a 3D image including a first view image and a second view image to a viewer. The method includes alternatingly arranging display units of the first view image and display units of the second view image on a display panel. The method also includes obtaining an information difference of a display unit of the second view image from the display units of the first view image, and re-calculating a pixel value of the display unit of the second view image. Further, the method includes displaying to the viewer the display unit of the second view image with the re-calculated pixel value via a light separation device.

Other aspects of the present disclosure can be understood by those skilled in the art in light of the description, the claims, and the drawings of the present disclosure.

DETAILED DESCRIPTION

Reference will now be made in detail to exemplary embodiments of the invention, which are illustrated in the accompanying drawings. Wherever possible, the same reference numbers will be used throughout the drawings to refer to the same or like parts.

During a 3D display process for a 3D display system, two or more view images with parallax are displayed on a display device, and the displayed images are processed by a light separation device of the 3D display system. A portion of the image information from a first view image display unit may be mixed with image information from a second view image display unit, which makes the first view image display unit generate information pollution to the second view image display unit. Similarly, a portion of the image information from the second view image display unit may be mixed with image information from the first view image display unit, which makes the second view image display unit generate information pollution to the first view image display unit.

To improve the 3D display effect, the first view image display units and the second view image display units are arranged alternatingly on the display panel. The image information difference to the second view image display units from the first view display units can be obtained, and the pixel value of the second view image display units can be re-calculated. The re-calculated pixel values can be used to display the second view image, which can be displayed after passing through the light separation device.

In certain embodiments, the light separation device may include, without limitation, a slit grating or a lens grating. Further, the 3D image may include, without limitation, two view images or more than two view images with parallax. Using two view images as an example, i.e., a left image and a right image for a viewer's left eye and right eye, respectively, the right view image may be used as the second view image to obtain the information difference to the right view image from the left view image, or the left image may be used as the second view image to obtain the information difference to the left view image from the right view image. Therefore, the crosstalk is reduced with respect to the 3D display effect of the left view image and the right view image. The order for processing the left view image and the right view image is not limited.

Figure 1:
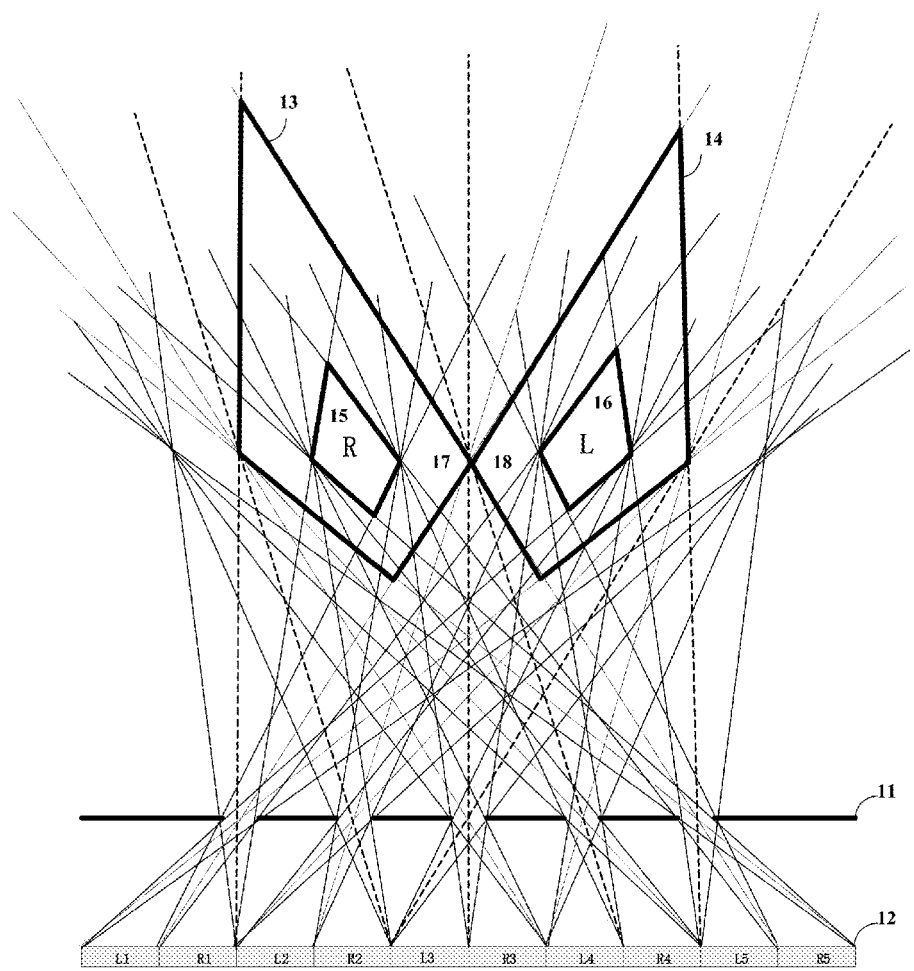
FIG. 1 illustrates exemplary division of various areas including viewing areas, actual viewing areas, and crosstalk areas consistent with the disclosed embodiments.

FIG. 1 illustrates exemplary division of various areas including viewing areas, actual viewing areas, and crosstalk areas. As shown in FIG. 1, a slit grating 11 is arranged in front of a display panel 12 (other type of grating can also be used). A pixel group R1, R2, R3, R4, and R5 on the display panel 12 are from the right view image, and a pixel group L1, L2, L3, L4, and L5 on the display panel 12 are from the left view image. The total number of pixels is used for illustrative purposes, and any number of pixels may be used.

The right and left view images displayed by the groups of pixels on the panel 12 pass the silt grating 11 and then form a right-eye viewing area 13 and a left-eye viewing area 14 within a predetermined viewing distance range in front of the display panel.

The right-eye viewing area 13 is formed by all right view images from the display panel 12 and the left-eye viewing area 14 is formed by all left view images from the display panel 12. When the viewer's right eye and the left eye are respectively located in the right-eye viewing area 13 and the left-eye viewing area 14, the viewer observes a 3D image.

However, because pixels for the left view image and the right view image are arranged alternatingly to produce a pair of images with parallax via the grating, within certain parts of the viewing areas, the view images may be mixed with each other. That is, a portion of the right view image enters into the left view image and a portion of the left view image enters into the right view image, which impacts the 3D viewing effect.

Within the right-eye viewing area 13, a second right-eye viewing area 15 is formed by the right view images from the pixel group R1, R2, R3, R4, and R5, without left view images from the pixel group L1, L2, L3, L4, and L5. Within the left-eye viewing area 14, a second left-eye viewing area 16 is formed by the left view images from the pixel group L1, L2, L3, L4, and L5, without left view images from the pixel group R1, R2, R3, R4, and R5. When the viewer's right eye and left eye are within the second right-eye viewing area 15 and the second left-eye viewing area 16, respectively, the 3D display effect is significantly improved.

The right-eye viewing area 13 (except the second right-eye viewing area 15) still contains some other light from the left view image, i.e., already containing significant information pollution. Similarly, the left-eye viewing area 14 (except the second left-eye view area 16 may also contain some other light from the right view image, i.e., already containing significant information pollution. Accordingly, the degree of information pollution in the second right-eye viewing area 15 and the second left-eye viewing area 16 is relatively low.

Thus, as shown in FIG. 1, the remaining area of the right-eye viewing area 13, other than the second right-eye viewing area 15, may be referred as the right-eye crosstalk area 17. If the viewer's right eye is located in the right-eye crosstalk area 17, the right view image perceived by the right eye is mixed with a portion of the left view image. Also, the remaining area of the left-eye viewing area 14, other than the second left-eye viewing area 16, may be referred as the left-eye crosstalk area 18. If the viewer's left eye is located in the left-eye crosstalk area 18, the left view image perceived by the left eye is mixed with a portion of the right-eye image.

Figure 2:
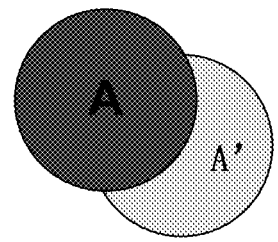
FIG. 2 illustrates a schematic diagram of the 3D display crosstalk phenomenon.

That is, when the view images with parallax are displayed after passing through the light separation device, the viewer's eyes may perceive overlapped first view image and second view image. For example, as shown in FIG. 2, as a part of the 3D scene, a first view image A and a second view image A' are overlapped. The view images look blurry and this is crosstalk between the first view image and the second view image.

Figure 3:
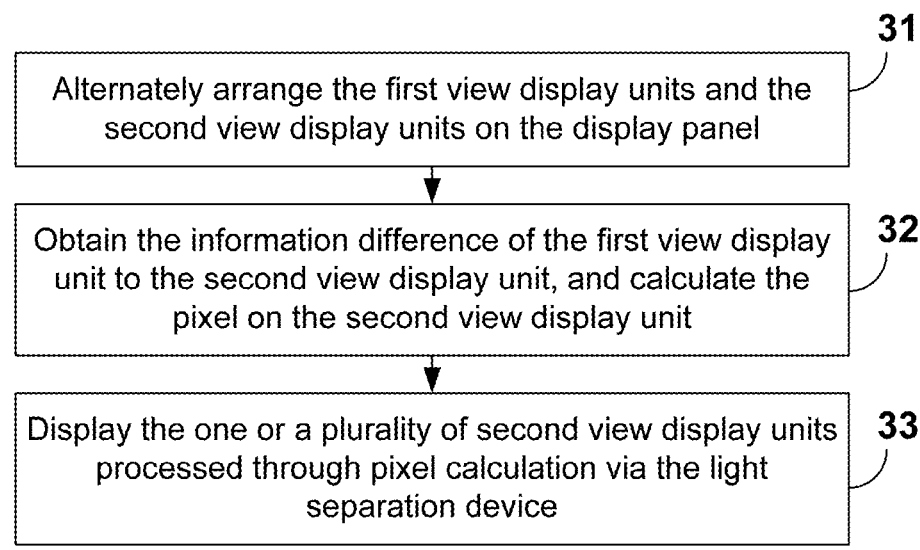
FIG. 3 illustrates an exemplary crosstalk reduction process consistent with the disclosed embodiments.

FIG. 3 illustrates an exemplary crosstalk reduction process consistent with the disclosed embodiments. As shown in FIG. 3, the crosstalk reduction process includes followings.

Step 31, arranging display units of a first view image and display units of a second view image alternatingly on the display panel.

For example, as shown in FIG. 1, R1, R2, R3, R4, and R5 are display units of the first view image, and L1, L2, L3, L4, and L5 are display units of the second view image. Display units R1, R2, R3, R4, and R5 of the first view image are arranged alternatingly with display units L1, L2, L3, L4, and L5 on the display panel. A display unit may include a pixel group, a pixel, or a sub-pixel.

Step 32, obtaining the information difference of a display unit of the second view image from the display units of the first view image, and re-calculating the pixel value of the display unit of the second view image. The information difference may be used to represent the degree of information pollution caused by the display units of the first view image on the display unit of the second view image.

Further, in Step 32, to obtain the information difference, the following steps may be performed.

Step 321, obtaining image information of the display units of the first view image.

For example, the pixel values of the display units of the first view image may be obtained.

Step 322, obtaining a crosstalk factor for the display units of the first view image with respect to the display unit of the second view image. The information difference is thus related to the image information of the display units of the first view image and the crosstalk factor for the display units of the first view image with respect to the display unit of the second view image, i.e., the crosstalk factor of the display unit of the second view image.

Further, in Step 32, to re-calculate the pixel value of the display unit of the second view image, the following steps may be performed.

Removing the information difference, caused by the display units of the first view image to a display unit of the second view image, from the image information of the display unit of the second view image.

Specifically, the formula (1) below may be used to perform pixel processing to remove the information difference of the display unit of the second view image from the display units of the first view image.

$$L'_k = L_k - \Sigma_{R_{k,j} \in I} P_{k,j} * R_{k,j} \quad (1)$$

where, set I denotes a set containing all display units of the first view image that generate the crosstalk to the display unit $L_k$ of the second view image, $R_{k,j}$ and j=0, 1, 2, ..., m, k=0, 1, 2, ..., where m is a total number of display units of the first view image generating crosstalk on the display unit of the second view image, and k is an integer less than or equal to a total number of the display units of the second view image.

$\Sigma_{R_{k,j} \in I} P_{k,j} * R_{k,j}$ denotes the information difference caused by the display units $R_{k,j}$ of the first view image with respect to the display unit $L_k$ of the second view image;

$P_k$ denotes the crosstalk intensity received by the display unit $L_k$ of the second view image from the display unit $R_{k,j}$ of the first view image;

$P_{k,j}$ denotes the crosstalk factor for the display units $R_{k,j}$ of the first view image with respect to the display unit $L_k$ of the second view image, and the crosstalk intensity $P_k$ and crosstalk factor $P_{k,j}$ satisfy the following condition: $\Sigma_j P_{k,j} = P_k$.

$L'_k$ denotes the processed display unit $L_k$ of the second view image after pixel calculation.

In general, the display units causing maximum crosstalk to the display unit $L_k$ of the second view image may be the display units of the first view image adjacent to the display unit $L_k$. Therefore, the value range of the number m is related to the size of the grating openings, and the distance between the display panel and the slit grating or lens grating. Other methods for determining the value of m may also be used.

To further ensure the display effect of the display units of the second view image, after removing the information difference caused by the display units of the first view image to the display unit of the second view image, the image information of the display unit of the second view image can be further compensated.

In other embodiments, in Step 32, to re-calculate the pixel value of the display unit of the second view image, the following steps may be performed.

The image information of the display unit of the second view image is compensated, and the compensation value may be related to the crosstalk intensity for the display unit of the second view image. The image information may include any appropriate information of the image or the display unit. For example, the image information may be brightness of the image or the display unit.

That is, after removing the information difference from the image information of the display unit of the second view image caused by the display units of the first view image, the image information of the display unit of the second view image can be compensated. More specifically, formula (2) below may be used to perform pixel processing for removing the information difference of the display unit of the second view image caused by the display units of the first view image.

$$L'_k = L_k + (P_k) \times L_k - \Sigma_{R_{k,j} \in I} P_{k,j} * R_{k,j} \quad (2)$$

where, set I denotes a set containing all display units of the first view image that generate the crosstalk to the display unit $L_k$ of the second view image, $R_{k,j}$ and j=0, 1, 2, ..., m, k=0, 1, 2, ..., where m is a total number of display units of the first view image generates crosstalk on the display unit of the second view image, and k is integer less than or equal to a total number of the display units of the second view image.

$(P_k) \times L_k$ denotes the compensation on the image information of the display unit of the second view image;

$\Sigma_{R_{k,j} \in I} P_{k,j} * R_{k,j}$ denotes the information difference caused by the display units $R_{k,j}$ of the first view image with respect to the display unit $L_k$ of the second view image;

$P_k$ denotes the crosstalk intensity received by the display unit $L_k$ of the second view image from the display unit $R_{k,j}$ of the first view image;

$P_{k,j}$ denotes the crosstalk factor for the display unit $R_{k,j}$ of the first view image with respect to the display unit $L_k$ of the second view image, and the crosstalk intensity $P_k$ and crosstalk factor $P_{k,j}$ satisfy the following condition $\Sigma_j P_{k,j} = P_k$.

$L'_k$ denotes the processed display unit $L_k$ of the second view image after pixel processing or calculation.

In general, the display units causing maximum crosstalk to the display unit $L_k$ of the second view image may be the display units of the first view image adjacent to the display unit $L_k$. Therefore, the value range of the number m is related to the size of the grating openings, and the distance between the display panel and the slit grating or lens grating. Other methods for determining the value of m may also be used.

The above steps may be performed for all individual display units of the second view image, such that the pixel processing of all individual display units of the second view image can be completed.

Step 33, after the pixel processing, one or more display units of the second view image display the second view image though a light separation device. Light from the display units of the second view image passes through the light separation device to be projected to the viewer to effect 3D display.

Similarly, pixel processing may also be performed on the display units of the first view image to remove crosstalk caused by display units of the second view image, the pixel values may also be compensated, and the first view image can be displayed via the light separation device.

Therefore, by performing pixel processing on the display unit of the second view image, the crosstalk on the display unit of the second view image from the display units of the first view image may be reduced, and the 3D display effect is improved.

Further, in certain embodiments, the crosstalk intensity $P_k$ in the above described formula (1) and formula (2) may be determined using, for example, one of the following two methods.

In the first method, the crosstalk intensity can be calculated as the sum of crosstalk factors of all display units of the first view image with respect to the display unit of the second view image.

For example, a total number of display units of the first view image contribute into the second view image, and the crosstalk intensity is defined as the sum of the crosstalk factors caused by all the total number of display units of the first view image on the display unit of the second view image.

In the second method, the above described crosstalk intensity can be calculated as the sum of the crosstalk factors caused by certain display units of the first view image adjacent to the display unit of the second view image.

For example, certain number of display units of the first view image adjacent to the display unit of the second view image contribute into the second view image, and the crosstalk intensity is defined as the sum of the crosstalk factors caused by the certain number of adjacent display units of the first view image on the display unit of the second view image. Alternatively, in other embodiments, the above-mentioned crosstalk factor may be set to a constant.

In certain embodiments, the crosstalk intensity $P_k$ received by the display unit $L_k$ of the second view image and the crosstalk factors $P_{k,j}$ received by the display unit $L_k$ of the second view image from the display units $R_{k,j}$ of the first view image may be obtained using the following calculations.

According to the known crosstalk intensity $P_k$ along with the proportional relationship between crosstalk intensity $P_k$ and crosstalk factor $P_{k,j}$, the crosstalk factor $P_{k,j}$ may be solved.

For example, the value of the crosstalk factor $P_{k,j}$ is related to the distance $|d_{k,j}|$ between the display unit $R_{k,j}$ of the first view image and the display unit $L_k$ of the second view image. The less the distance $|d_{k,j}|$, the larger the crosstalk factor. The relationship between the crosstalk factor $P_{k,j}$ and the distance $|d_{k,j}|$ may be expressed with the function H.

$$\tilde{P}_{k,j} = H(d_{k,j})$$

where $d_{k,j}$ is a distance vector with a value and a direction, $\tilde{P}_{k,j}$ is un-normalized crosstalk factor and is marked with a tilde sign.

Thus, the following formula (3) may be used to calculate the crosstalk factor $P_{k,j}$.

$$P_{k,j} = P_k * \frac{\tilde{P}_{k,j}}{\Sigma_j \tilde{P}_{k,j}}, \quad (3)$$

$P_{k,j}$ can be solved by calculating the un-normalized crosstalk factor of each of the display units of the second view image, and then performing normalization using formula (3).

Further, it may be assumed that the display units of the first view image causing the maximum crosstalk to the display unit $L_k$ of the second view image are the only two display units $R_{k,1}$, $R_{k,2}$ on the left side and the right side of $L_k$. It may be further assumed that the distances from the display units $R_{k,1}$, $R_{k,2}$ of the first view image to the display unit $L_k$ of the second view image are the same. Therefore, it can be considered that the display units $R_{k,1}$, $R_{k,2}$ of the first view image cause the same crosstalk factors to the display unit $L_k$ of the second view image, and $$P_{k,1} = P_{k,2} = 0.5 * P_k$$

After the crosstalk intensity $P_k$ and crosstalk factor $P_{k,1}$, $P_{k,2}$ are obtained, the following formula (4) may be used to recalculate the pixel value $L'_k$ of the display unit $L_k$ of the second view image.

$$L'_k = (P_k+1) \times L_k - 0.5 \times P_k \times (R_{k-1} + R_k) \quad (4)$$

where the crosstalk intensity $P_k$ is the sum of crosstalk factors caused by the display units $R_{k,1}$, $R_{k,2}$ of the first view image to the display unit of the second view image, $0 \leq P_k \leq 1$, and $L'_k$ is the re-calculated value of the display unit of the second view image after performing the pixel processing on the display unit of the second view image $L_k$.

The above illustrated calculation process may include removing the information difference caused by the display units of the first view image to a display unit of the second view image and compensating the image information of the display unit of the second view image $L_k$. The order of the pixel processing is not limited, and the formula (4) may be used for pixel processing to maintain the brightness of the display unit $L_k$ of the second view image.

Figure 4:
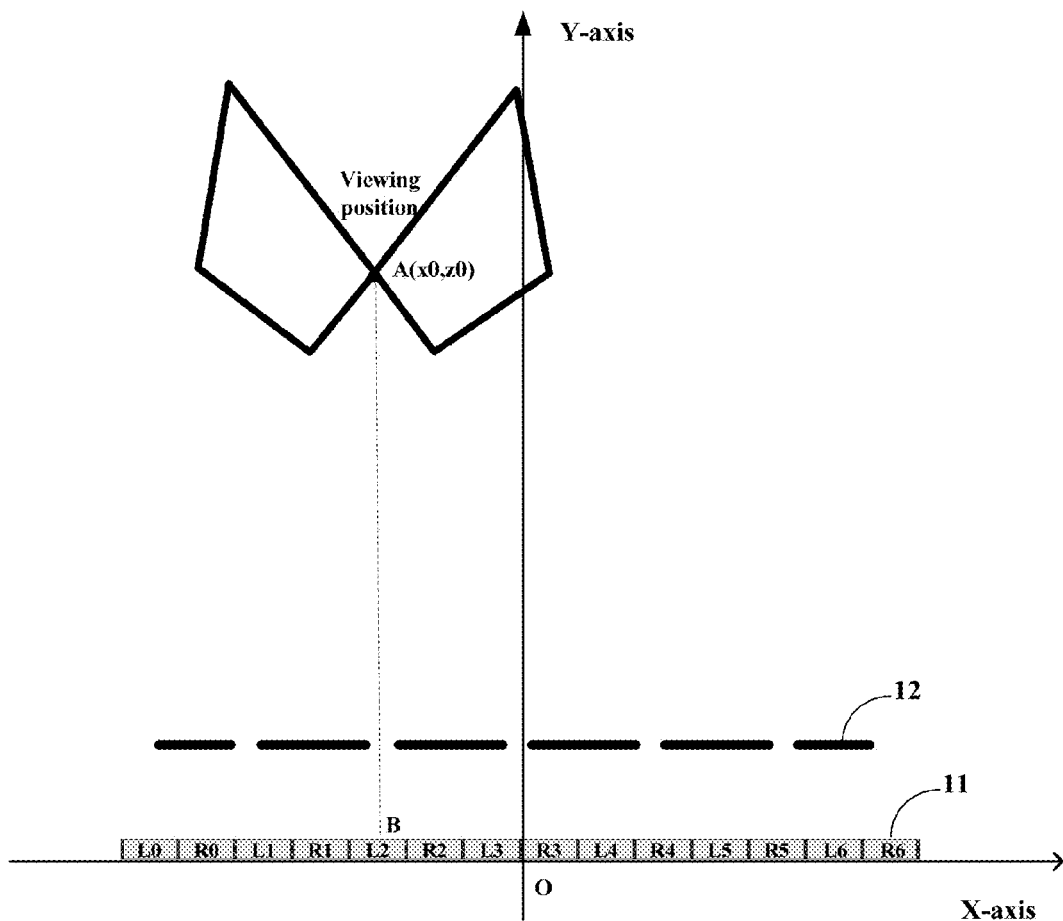
FIG. 4 illustrates an exemplary crosstalk intensity calculation consistent with the disclosed embodiments.

Further, the crosstalk intensity $P_k$ may also be calculated as followings. First, the crosstalk intensity $P_k$ can be dynamically adjusted according to the viewer's position. The crosstalk intensity may increases or decreases with respect to the distance between display units of the other view image and the viewer. FIG. 4 illustrates an exemplary crosstalk intensity calculation consistent with the disclosed embodiments.

As shown in FIG. 4, a coordinate system is created, with the X-axis representing the direction of the arrangement of display units on the display panel and Y-axis representing the vertical direction from the center of the display panel. It may be assumed that, at one moment of time, the position A (x0, z0) of the center-eye point (i.e., the middle point of the viewer's both eyes) is in the front of the display unit B on the display panel.

By observing the optical paths of FIG. 1, due to the differences of the viewing angles, the pixels nearby the display unit B cause the minimum crosstalk to the diamond-shaped areas in FIG. 4. The further the display units are close to both ends of the X-axis, the greater the crosstalk is. Therefore, at this moment of time, the values of the crosstalk intensity $P_k$ may be symmetric with reference to $x=x_0$, i.e., along the line connecting points A and B. Along with the both ends of the display panel, the crosstalk intensity $P_k$ may monotonically increase, which can be calculated using the following formula (5).

$$P_k = f(A(x, z), k) \quad (5)$$

where $A(x, z)$ is the coordinates of the center-eye point of the viewer; x represents the horizontal position; and z represents the distance from the center-eye point to the display panel.

Assuming that the value of the crosstalk intensity $P_k$ is symmetrical with reference to x and decrease monotonically (may be nonlinearly) towards both ends of the X-axis, the crosstalk intensity can be expressed as $$P_k(x) = a \times |\Delta x| + b \times |z| + c$$

where $\Delta x$ is the horizontal distance from $A(x, z)$ to the pixel $L_k$ of the first view image, dotpitch is the size of the pixel; and a, b, c are the parameters.

Second, for calculating the crosstalk intensity $P_k$, the crosstalk intensity is adjusted in real-time according to 3D display parallax value, in which the crosstalk intensity increases or decreases with respect to the parallax value and the display units in the other view image.

When the viewer is watching the stereoscopic display, the image portion with larger parallax value has a higher degree of crosstalk, while the image portion with smaller parallax value has a relatively lower degree of crosstalk. That is, the crosstalk intensity $P_k$ changes monotonically with respect to parallax value of the displayed contents of the display unit $L_k$ of the second view image. Assuming that the pixel coordinates of the display unit $L_k$ of the second view image is $A'(\bar{x}, \bar{y})$, where A is spatial coordinates and A' is the image coordinate system, and $D_{L_k}(\bar{x}, \bar{y})$ is the parallax value of the displayed contents of the display unit $L_k$ of the second view image, the crosstalk intensity $P_k$ may be calculated using the formula (6) below.

$$P_k = g(D_{L_k}(\bar{x}, \bar{y})) \quad (6)$$

Where the function g( ) decreases monotonically with reference to $D_{L_k}$. In certain embodiments, the function g( ) may be assumed to decrease monotonically and linearly. Then, the crosstalk intensity $P_k$ may also be calculated using the formula (7).

$$P_k = -a' \times D_{L_k}(\bar{x}, \bar{y}) + b' \quad (7)$$

More specifically, the above formula (7) may be used to calculate the crosstalk intensity $P_k$ for the portion of image with relative large parallax values, while the crosstalk effect of the portion of image with relative small parallax values may be ignored. Because image contents with a larger parallax is generally observed and considered as the core portion of contents by the viewer, such approach may greatly improve the effect of the stereoscopic display.

Further, combined with tracking and parallax factors, the crosstalk intensity can be expressed by:

$$P_k = Q(A(x, y), D_{L_k}(\bar{x}, \bar{y})) \quad (8)$$

The function Q( ) is characterized by the functional relationship between $P_k$ and $A(x, y)$, $D_{L_k}(\bar{x}, \bar{y})$, and k. On the other hand, the formula (5) and (6) may be combined together to generate the formula (9) below.

$$P_k = f(A(x, y), k) + g(D_{L_k}(\bar{x}, \bar{y})) \quad (9)$$

The function modeling can be created based on the characteristics of function f( ) and go.

Figure 5:
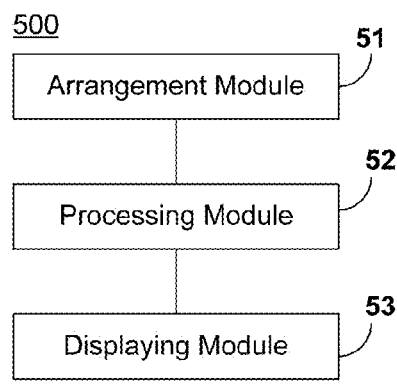
FIG. 5 illustrates a block diagram of an exemplary 3D display system consistent with the disclosed embodiments.

FIG. 5 illustrates a block diagram of an exemplary 3D display system consistent with the disclosed embodiment. As shown in FIG. 5, the 3D display system 500 includes an arrangement module 51, a processing module 52, and a displaying module 53. Other components may also be included.

The arrangement module 51 may be configured to alternatingly arrange the display units of the first view image and the display units of the second view image on a display panel of display module 53. The processing module 52 may be configured to obtain information difference caused by the display units of the first view image to the display unit of the second view image, and to perform pixel processing/recalculation on the display unit of the second view image. Further, the display module 53 may be configured to display one or more display units of the second view image after pixel processing via a light separation device. A display unit may include a pixel group, a pixel, or a sub-pixel.

In certain embodiments, the processing module 52 may further include a first obtaining unit and a second obtaining unit. The first obtaining unit may be configured to obtain image information of the display units of the first view image. The second obtaining unit may be configured to obtain a crosstalk factor for the display units of the first view image with respect to the display unit of the second view image. The information difference is thus related to the image information of the display units of the first view image and the crosstalk factor for the display units of the first view image with respect to the display unit of the second view image, i.e., the crosstalk factor of the display unit of the second view image.

The processing module 52 may further includes a first calculation unit and a second calculation unit (not shown). The first calculation unit may be configured to remove the information difference, caused by the display units of the first view image to a display unit of the second view image, from the image information of the display unit of the second view image.

The second calculation unit may be configured to compensate the image information of the display unit of the second view image. The compensation value may be related to the crosstalk intensity for the display unit of the second view image. The image information may include any appropriate information of the image or the display unit. For example, the image information may be brightness of the image or the display unit In certain embodiments, the 3D display system 500 device may further include a first adjustment module which is configured to dynamically adjust the crosstalk intensity based on the viewer's position. The crosstalk intensity increases or decreases with respect to the distance between the display units of the first view image and the viewer's position.

In certain embodiments, the 3D display system 500 further includes a second adjustment module which is configured to update the crosstalk intensity in real time based on 3D display parallax value. The crosstalk intensity increases or decreases with respect to the parallax value between the first view image and the second view image.

Further, the crosstalk intensity may be calculated as the sum of crosstalk factors of all display units of the first view image with respect to the display unit of the second view image. The crosstalk intensity can also be calculated as the sum of the crosstalk factors caused by certain display units of the first view image adjacent to the display unit of the second view image. In certain embodiments, the crosstalk factor may be set to a constant value.

Figure 6:
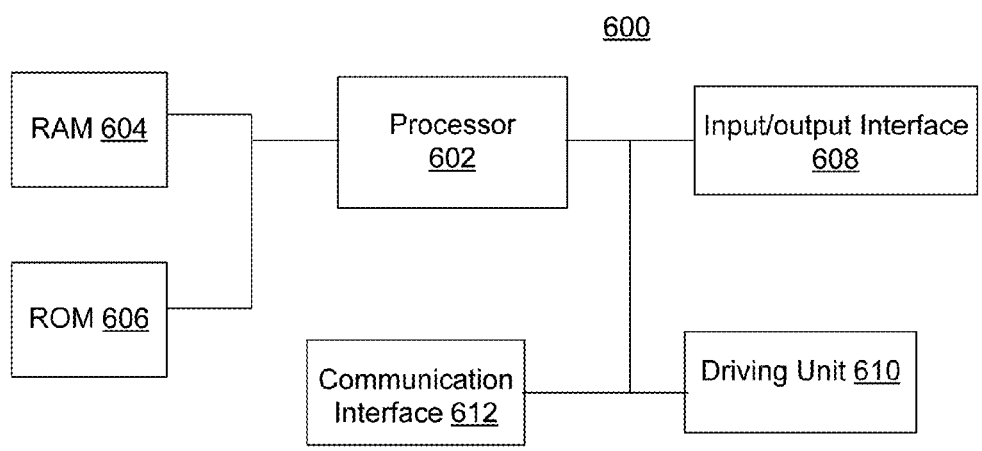
FIG. 6 illustrates an exemplary computer system consistent with the disclosed embodiments.

The 3D display system 500 may be implemented in any appropriate computer-based system through hardware, software, or a combination of hardware and software. FIG. 6 illustrates an exemplary computing system implementing the 3D display system consistent with the disclosed embodiments.

As shown in FIG. 6, computing system 600, such as a smart phone, a tablet computer, a notebook computer, a desktop computer, etc., may include a processor 602, a random access memory (RAM) unit 604, a read-only memory (ROM) unit 606, an input/output interface unit 608, a driving unit 610, and a communication interface 612. Other components may be added and certain devices may be removed without departing from the principles of the disclosed embodiments.

Processor 602 may include any appropriate type of graphic processing unit (GPU), general-purpose microprocessor, digital signal processor (DSP) or microcontroller, and application specific integrated circuit (ASIC), etc. Processor 602 may execute sequences of computer program instructions to perform various processes associated with computing system 600. The computer program instructions may be loaded into RAM 604 for execution by processor 602 from read-only memory 606 to process various 3D images.

Input/output interface 608 may be provided for users to input information into 3D display system 500 or for the viewers to receive information from 3D display system 500. For example, input/output interface 608 may include any appropriate input device, such as a remote control, a keyboard, a mouse, an electronic tablet, a voice communication device, or any other optical or wireless input device. Further, driving unit 610 may include any appropriate driving circuitry to drive various devices, such as the pixel panel and/or the grating.

Further, communication interface 612 may provide communication connections such that computing system 600 may be accessed by and/or communicate with other processors or systems through computer networks or other communication links via various communication protocols, such as transmission control protocol/internet protocol (TCP/IP) and hyper text transfer protocol (HTTP).

The above described embodiments are only for illustrative purposes. It should be noted that those skilled in the art, without departing from the principles of the present disclosure, may make certain improvements and modifications, and these improvements and modifications should also be considered within the scope of the disclosure.

Other applications, advantages, alternations, modifications, or equivalents to the disclosed embodiments are obvious to those skilled in the art.

What is claimed is:

1. A three-dimensional (3D) display system for displaying a 3D image including a first view image and a second view image to a viewer, comprising:
    an arrangement module configured to alternatingly arrange a plurality of display units of the first view image and a plurality of display units of the second view image on a display panel;
    a processing module configured to obtain an information difference of a display unit of the second view image from display units of the first view image related to the display unit of the second view image, and re-calculate a pixel value of the display unit of the second view image;

a displaying module configured to display to the viewer the display unit of the second view image with the re-calculated pixel value via a light separation device; and a first adjustment module configured to dynamically adjust a crosstalk intensity based on a viewer's position, wherein the crosstalk intensity increases or decreases with respect to a distance between the display units of the first view image and the viewer's position, wherein the processing module further includes:

a first obtaining unit configured to obtain image information of the plurality of display units of the first view image; and a second obtaining unit configured to obtain crosstalk factors for the display units of the first view image with respect to the display unit of the second view image, wherein the information difference is related to the image information of the display units of the first view image and the crosstalk factors for the display units of the first view image with respect to the display unit of the second view image, and a sum of the crosstalk factors is related to the crosstalk intensity for the display unit of the second view image.

2. The 3D display system according to claim 1, wherein the display unit includes a pixel group, a pixel, or a sub-pixel.

3. The 3D display system according to claim 1, wherein the processing module further includes:

a first calculation unit configured to remove the information difference, caused by the display units of the first view image to the display unit of the second view image, from the image information of the display unit of the second view image.

4. The 3D display system according to claim 3, wherein the processing module further includes:

a second calculation unit configured to compensate the image information of the display unit of the second view image, wherein a compensation value is related to the image information of the display unit of the second view image, and the crosstalk intensity for the display unit of the second view image.

5. The 3D display system according to claim 1, further including:

a second adjusting module configured to update the crosstalk intensity in real-time according to parallax between the first view image and the second view image, wherein the crosstalk intensity increases or decreases with respect to a first view parallax value and a second view parallax value.

6. The 3D display system according to claim 1, wherein the crosstalk intensity is calculated as the sum of the crosstalk factors caused by the display units of the first view image to the display unit of the second view image.

7. The 3D display system according to claim 1, wherein the crosstalk intensity is calculated as the sum of the crosstalk factors caused by certain display units of the first view image adjacent to the display unit of the second view image.

8. The 3D display system according to claim 1, wherein the crosstalk factors are set as fixed values.

9. A method for reducing stereoscopic display crosstalk in a three-dimensional (3D) display system for displaying a 3D image including a first view image and a second view image to a viewer, the method comprising:

alternatingly arranging display units of the first view image and display units of the second view image on a display panel;

obtaining an information difference of a display unit of the second view image from the display units of the first view image, and re-calculating a pixel value of the display unit of the second view image;

displaying to the viewer the display unit of the second view image with the re-calculated pixel value via a light separation device; and dynamically adjusting a crosstalk intensity based on a viewer's position, wherein the crosstalk intensity increases or decreases with respect to a distance between the display units of the first view image and the viewer's position, wherein obtaining an information difference further includes:

obtaining image information of the display units of the first view image; and obtaining crosstalk factors for the display units of the first view image with respect to the display unit of the second view image, wherein the information difference is related to the image information of the display units of the first view image and the crosstalk factors for the display units of the first view image with respect to the display unit of the second view image, and a sum of the crosstalk factors is related to the crosstalk intensity for the display unit of the second view image.

10. The method according to claim 9, wherein a display unit includes a pixel group, a pixel, or a sub-pixel.

11. The method according to claim 9, wherein re-calculating a pixel value of the display unit of the second view image includes:

removing the information difference, caused by the display units of the first view image to a display unit of the second view image, from the image information of the display unit of the second view image.

12. The method according to claim 11, wherein re-calculating a pixel value of the display unit of the second view image includes:

compensating the image information of the display unit of the second view image, wherein a compensation value is related to the image information of the display unit of the second view image, and the crosstalk intensity for the display unit of the second view image.

13. The method according to claim 12, further including:

dynamically adjusting the crosstalk intensity in real-time according to parallax between the first view image and the second view image; wherein the crosstalk intensity increases or decreases with respect to a first view parallax value and a second view parallax value.

14. The method according to claim 1 wherein the crosstalk intensity is calculated as the sum of the crosstalk factors caused by the display units of the first view image to the display unit of the second view image.

15. The method according to claim 1 wherein the crosstalk intensity is calculated as the sum of the crosstalk factors caused by certain display units of the first view image adjacent to the display unit of the second view image.

16. The method according to claim 1, wherein the crosstalk factors are set as fixed values.

17. The 3D display system according to claim 1, wherein:

provided that I denotes a set containing all display units of the first view image that generate the crosstalk to the display unit of the second view image, and k and j are integers, the information difference caused by the display units $R_{k,j}$ of the first view image with respect to the display unit $L_k$ of the second view image is calculated by:

$$\sum_{R_{k,j}\in I} P_{k,j} * R_{k,j}$$

wherein $P_{k,j}$ denotes the crosstalk factor for the display units $R_{k,j}$ of the first view image with respect to the display unit $L_k$ of the second view image.

18. The 3D display system according to claim 17, wherein:
the pixel value of the display unit of the second view image is recalculated by:

$$L'_k = L_k - \sum_{R_{k,j}\in I} P_{k,j} * R_{k,j}$$

wherein $L'_k$ denotes the recalculated pixel value and $L_k$ denotes an original pixel value of the display unit of the second view image.

* * * * *